United States Patent [19]

Schnettler et al.

[11] 4,437,837
[45] Mar. 20, 1984

[54] EDUCATIONAL AID AND METHOD OF USING SAME

[76] Inventors: Shirley I. Schnettler, 5311 W. Berteau, Chicago, Ill. 60641; Elinor Gilloon, 77 N. Michigan Ave., Chicago, Ill. 60611

[21] Appl. No.: 329,728

[22] Filed: Dec. 11, 1981

[51] Int. Cl.³ .............................................. G09B 17/00
[52] U.S. Cl. .................................................... 434/178
[58] Field of Search ............................... 434/167, 178

[56] References Cited
PUBLICATIONS

American Guidance Service (AGS) 1973 Catalog, Cover Page, pp. 42–52.

Primary Examiner—William H. Grieb
Attorney, Agent, or Firm—Bernard L. Kleinke

[57] ABSTRACT

An educational method uses an ordered group of instructional elements having a series of sentence indicia thereon. A first sentence indicia includes first alphabetic indicia representing a first single high-frequency word to be learned and at least a first rebus indicia representing a word equivalent cooperating with the high-frequency word to help form a first sentence. The first sentence facilitates the decoding of the first alphabetic indicia. A second sentence indicia includes second alphabetic indicia representing the single high-frequency word to be learned, and at least a second rebus indicia representing a word equivalent cooperating with the high-frequency word to help form a second sentence. Third and fourth sentence indicia include respective third and fourth alphabetic indicia representing a second single high-frequency word to be learned as well as at least respective third and fourth rebus indicia representing word equivalents cooperating with the third and fourth alphabetic indicia to help form respective third and fourth sentences. An auxilliary learning reinforcement aid is used to play a game for reinforcing the learning of the high-frequency words introduced by the instructional elements. The first sentence indicia is displayed to the learner, who is requested to read and decode the first alphabetic indicia representing the single high-frequency word to be learned. The second, third and fourth sentence indicia are displayed in like manner. The method is then continued with additional instructional elements, followed by the use of the reinforcement aid.

8 Claims, 2 Drawing Figures

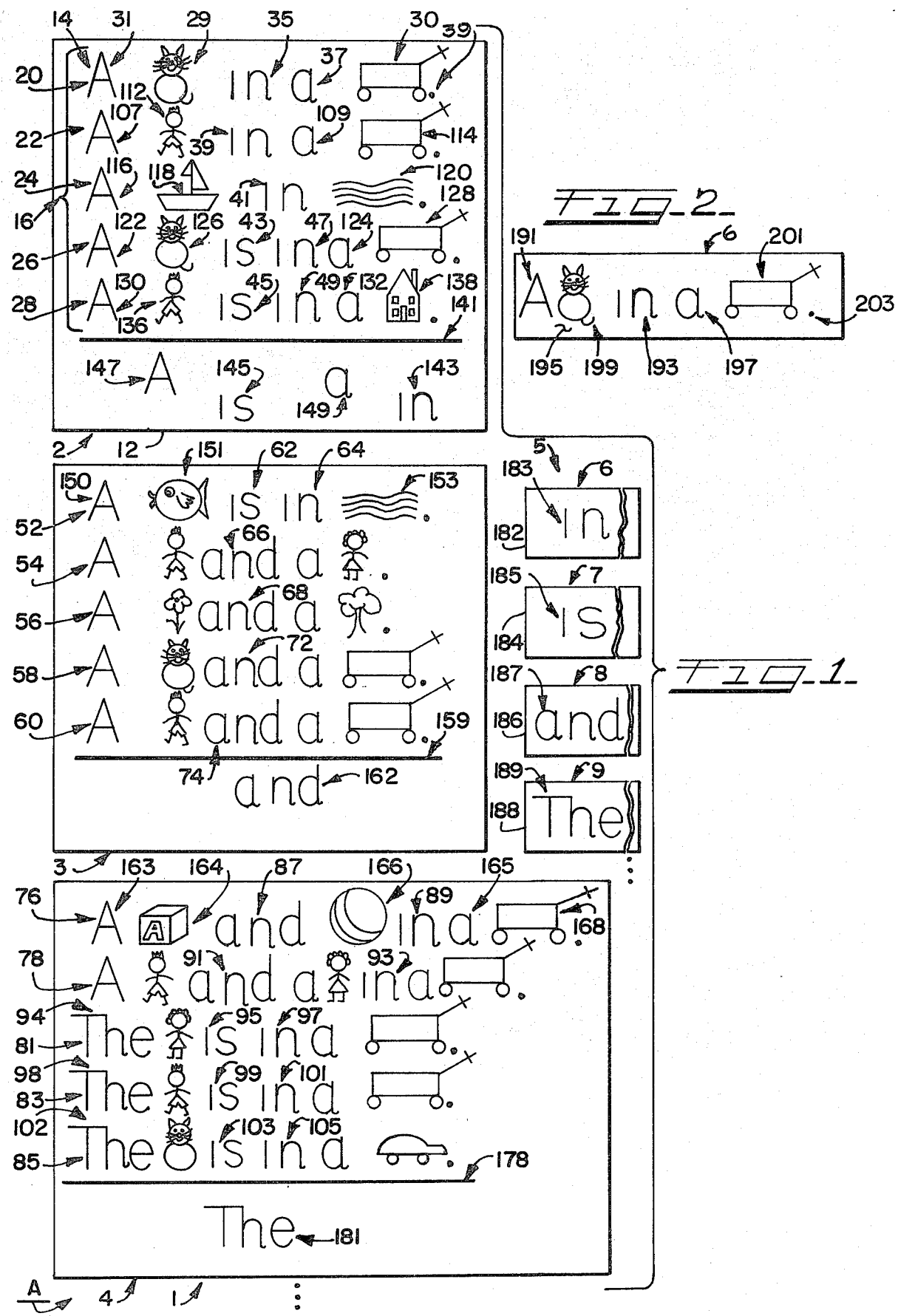

EDUCATIONAL AID AND METHOD OF USING SAME

DESCRIPTION

1. Technical Field

This invention relates to an educational aid and a method of using it for facilitating the instruction of learners in the ability to read, and more particularly relates to an educational aid and a method of using it for facilitating the learning of high-frequency basic sight words.

2. Background Art

Educational aids in the form of flash cards, books, and other such devices have been employed to facilitate the learning of reading skills. Such educational aids have included devices having rebus symbols, printed thereon, to help facilitate the learning of reading skills. A rebus symbol is a picture or other representation of an object or an action to symbolize the word equivalent thereof in a printed sentence. Children of pre-school age, or who have not yet learned to read, generally are able to recognize pictorial depictions of objects and of simple actions, such, for example, as a drawing of a cat. The use of printed rebus symbols in printed sentences serves to create interest in learning how to read by attracting the attention of the learner by giving a game-like feeling to the use of the educational aid.

While such printed rebus symbols have been used with teaching aids to facilitate the acquiring of reading skills, printed rebus symbols are not entirely satisfactory in learning certain frequently used words, which are not nouns or other words that can be readily depicted by a rebus symbol. Such high-frequency words are commonly referred to as "basic sight words", which include prepositions, verbs, adjectives and other simple words, such as "in", "is", "it" and the like. The basic sight words are words which occur most frequently, and are structural words which provide the major portion of any context. Such basic words must be learned before other more complex words can be learned, since the basic words provide linguistic clues to sentence patterns.

Academic studies, such as that reported in "The American Heritage Word Frequency Book", Houghton Mifflin Co. and American Publishing Co., Inc. 1971, have found that, in reading materials of the complexity used in the lower school grades in the United States schools, approximately five hundred basic words occur frequently, accounting for almost ninety percent of the vocabulary. The basic sight words constitute a smaller number of these five hundred words. It has been found that the basic sight words occur so frequently that in order to become an effective reader, a person should learn to recognize such printed words, instantly, at sight. That is, the learner should recognize the printed basic sight words by their appearance, rather than by sounding out the words phonetically each time they are encountered.

In the past, the basic sight words have been introduced initially to the learner by having the teacher articulate the word in a spoken context and by using other letter-sound associations. In this regard, by using learning aids, the printed word to be taught is shown to the learner, and a certain sentence is read to the learner with the particular basic sight word to be learned missing from the sentence. In this manner, the learner attempts to gain facility at the instant recognition of basic sight words. Such a technique is described in the "Teacher's Guide—Getting Ready to Read", Houghton Mifflin Company, Boston, Mass., 1976.

While such a technique may be satisfactory for some applications, learning to recognize basic sight words, instantly, by using prior known educational aids, has been tedious and difficult for the learner. In this regard, such techniques have frequently been found to be somewhat boring and not challenging and intriguing for the learner. Since a sentence including the word to be learned is merely read to the learner, the mind must first follow the verbalization of the sentence, and then visually observe the educational aid bearing the printed word to be learned. Thus, the learner must mentally make the association between the verbal missing word and the visually perceptible unknown, newly-introduced word. Such visual and verbal association is not easily grasped.

Such a method is therefore at least somewhat difficult for the inexperienced reader to use and thus difficult for a person to achieve the goal of learning to identify the basic sight words. Additionally, prior known educational aids have employed a variety of different methods and devices to help reinforce the newly-learned words in the mind of the learner. Completely different learning aids and teaching methods are employed for a series of practice exercises for reinforcing the learning of the newly-introduced words. Thus, the learner must first become familiar with a new set of instructions before attempting the new practice exercise. Hence, as a result of the requirement to learn a different set of instructions, for each lesson, the learner can lose interest in the learning.

Therefore, it would be highly desirable to have an educational aid and a technique for using it to facilitate greatly the learning of high-frequency basic sight words in a challenging and attention-holding manner. Moreover, it is highly important and desirable to have such an educational aid, as well as a method of using it, to help accomplish the difficult task of learning basic sight words and yet have a greatly simplified, easy-to-follow and understand teaching plan and instructions for the learner. It would also be extremely desirable to have an educational aid, and a method of using it, to enable the learner not only to acquire the ability to recognize basic sight words, but also to learn to read sentences and series of sentences, at the same time.

DISCLOSURE OF INVENTION

Therefore, the principal object of the present invention is to provide a new and improved educational aid and a method of using it to facilitate greatly the learning of words, including high-frequency basic sight words, in a challenging and interesting manner.

A further object of the present invention is to provide such a new and improved educational aid and a method of using it, to help accomplish the learning of words, including basic sight words, while having a greatly simplified, easy-to-follow and understand teaching plan.

Another object of the present invention is to provide such a new and improved educational aid and a method of using it, to enable the learner to acquire the ability to read sentences, as well as groups of sentences, while learning to identify printed basic sight words instantly upon seeing them.

Briefly, the above and further objects of the present invention are realized by providing an educational aid which includes an ordered group of teaching or instructional elements designed to be used seriatim in accordance with a teaching plan. Each instructional element includes a background member having indicia thereon.

The indicia includes a series of sentence indicia, the first one of which includes a first alphabetic indicia representing a first single high-frequency word to be learned and at least a first rebus indicia representing a word equivalent cooperating with the high-frequency word to help form a first sentence. The first sentence represented by the first sentence indicia facilitates the decoding of the first alphabetic indicia in accordance with a teaching plan. A second one of the sentence indicia includes a second alphabetic indicia representing the single high-frequency word to be learned for repetition purposes, and at least a second rebus indicia representing a word eqivalent cooperating with the high-frequency word to help form a second sentence, thereby facilitating the decoding of the second alphabetic indicia.

A third one of the sentence indicia includes a third alphabetic indicia representing a second single high-frequency word to be learned and at least a third rebus indicia representing a word equivalent cooperating with the second high-frequency word to help form a third sentence, whereby the decoding of the third alphabetic indicia is facilitated. A fourth one of the sentence indicia includes a fourth alphabetic indicia representing the second single high-frequency word to be learned for repetition purposes, together with at least a fourth rebus indicia representing a word equivalent cooperating with the second high-frequency word to help form a fourth sentence to facilitate the decoding of the fifth alphabetic indicia in accordance with the teaching plan.

An auxiliary learning reinforcement aid is provided and includes a set of game elements for use seriatim following the use of the instructional elements. The learning reinforcement aid includes individual backing members, each one having a front face bearing a different alphabetic indicia representing one of the high-frequency words to be learned represented by the corresponding alphabetic indicia of the instructional elements. Different sentence indicia are disposed on the rear faces of the reinforcement aid elements, the sentence indicia representing sentences including the high-frequency word represented by the indicia on their front faces.

The method of the present invention is to display the first one of the sentence indicia of the instructional elements to the learner, and then direct the attention of the learner to the first alphabetic indicia representing the single high-frequency word to be learned for explaining the word to the learner. The second one of the sentence indicia is then displayed to the learner, and the learner is then requested to read the second sentence to facilitate the decoding of the second indicia. The third one of the sentence indicia is displayed to the learner who is then requested to read the third sentence to facilitate the decoding of the third alphabetic indicia. This procedure is repeated indefinitely to introduce additional new high-frequency words to the learner.

Once one or more of the high-frequency words to be learned are introduced to the learner by means of the instructional elements, the auxiliary learning reinforcement aids are then used for the purpose of reinforcing the learning of the high-frequency words introduced by the instructional elements. The alphabetic indicia on the front faces thereof are displayed seriatim to one or more learners to have them identify the word represented by the alphabetic indicia thereon. If the word is correctly identified, the reverse side of the reinforcement aid element is then displayed to the learner who is then requested to read the sentence represented by the sentence indicia thereon.

Thus, the educational aid and method of using it according to this invention, employs the same format repeatedly in the instruction elements and then in the reinforcements elements for not only reinforcement purposes, but also to avoid the necessity of having new instructions for each learning session. Therefore, the interest of the learner is maintained. The knowledge gained by the learner is reinforced repeatedly, and the same mode of learning is used repetitively. The learner does not have to learn new instructions for each lesson, and thus does not become bored and the learning experience does not become tedious. Only a single, uniform mode of teaching is employed, which is relatively simple to understand. The method of the present invention is relatively uncomplicated and easy to use for both the teacher employing the educational aid and the learner receiving the benefit therefrom.

The uniform format of the inventive educational aid removes the distractions faced by a student confronted by a variety of teaching formats and techniques. The learner does not have to waste time and energy in readjusting his attention and mental set from one lesson to the next.

The use of rebus indicia creates and maintains interest in the learning aid, as well as the reinforcement elements, which can be used as a gam. The rebus indicia enable the learner to identify high-frequency words on sight, without directly representing the basic word to be learned in rebus symbology. Moreover, the sentence indicia help the learner to become acquainted with sentence structure, and thus the series of sentence indicia represent a series of organized and arranged sentences, which hold the attention of the learner.

BRIEF DESCRIPTION OF THE DRAWINGS

The above-mentioned and other objects and features of this invention and the manner of attaining them will become apparent, and the invention itself will be best understood by reference to the following descriptive embodiments of the invention taken in conjunction with the accompanying drawings, wherein:

FIG. 1 is a front face view of an educational aid which is constructed in accordance with the invention; and FIG. 2 is a rear face view of the reverse side of one of the elements of the auxiliary learning reinforcement aid of FIG. 1.

BEST MODE FOR CARRYING OUT THE INVENTION

Referring now to FIG. 1, there is shown an educational aid generally indicated at A, which is constructed according to the present invention. The aid A includes an ordered set 1 of instructional elements, including the first three elements 2, 3 and 4, and an ordered set 5 of auxiliary reinforcement elements, which includes the first four elements 6, 7, 8 and 9. The dots following each of the sets 1 and 5 indicate that there are additional elements (not shown) in each set for introducing and practicing additional words to be learned, as will be understood by those skilled in the art. The ordered set 1 of instructional elements is used to facilitate the initial introduction of high-frequency words, including the basic sight words, to the learners, and the ordered set 5 of the auxiliary reinforcement elements is used to fortify the reading ability gained through the use of the instructional elements.

The educational aid A can be used for pre-school children, primary grade school children, as well as children with learning disabilities and retarded children. The aid A can be used to help bilingual adults who desire to learn English. It can slo be used for instructing handicapped persons, such as retarded and partially sighted persons.

The set 1 of the instructional elements will now be described in greater detail. The element 2 has a background member 12, which includes on its front face, indicia generally indicated at 14. The member 12 is composed of a flat rigid material, such as paper, paperboard, or other suitable material. Preferably, the background members of the instructional elements are composed of paper and are bound or otherwise assembled together in book form. However, it will become apparent to those skilled in the art that the background members also may be transparent and thus suitable for use in slide and overhead projectors to project the indicia, such as the indicia 14, on a screen, or the like. Also, it is contemplated to form the images of the indicia 14 on television screens for educational purposes. Also, the background members can be in the form of individual paper sheets, which may be produced in multiple duplicate copies for use by an entire class of students by conventional reproduction techniques, such as printing, photocopying, and the like.

The indicia 14 includes a series or group of sentence indicia generally indicated at 16. The group 16 comprises sentence indicia 20, 22, 24, 26 and 28. Each one of the sentence indicia, such as the sentence indicia 20, includes at least one rebus indicia representing the word equivalent thereof, and also includes at least one alphabetic indicia representing a word. One of the alphabetic indicia represents a single high-frequency word to be learned. The word equivalents and words represented by the rebus indicia and the alphabetic indicia, respectively, cooperate to form sentences to facilitate the decoding of the high-frequency word to be learned.

In use, the learner can readily decode the rebus indicia to understand the context of the sentence, which context serves as a clue for the decoding of the alphabetic indicia representing the high-frequency word to be learned. In this manner, a person can learn to identify the high-frequency word to be learned in an easy-to-learn, interesting manner. The young or inexperienced learner can immediately gain confidence in his or her reading ability, because the use of the rebus indicia to help learn the difficult high-frequency basic sight words is interesting and enables the learner to begin reading sentences at the very first attempt. The building of confidence is extremely beneficial to the acquiring of reading skills. The increase in confidence is a source of encouragement for the person in attacking and learning new words.

The first few sentence indicia have only one alphabetic indicia representing the same word—the high-frequency word to be learned. Thus, through repetition, the identification of the word to be learned is reinforced in the mind of the learner, and yet, the reinforcement is accomplished in an interesting and stimulating manner, since the succeeding sentences represented by the sentence indicia are all new and different to the learner.

The next few sentence indicia, some of which may be disposed on succeeding instructional elements, introduce another single high-frequency basic sight word to be learned. All of the alphabetic and rebus indicia included therein are known or previously learned by the learner, and only the high-frequency word to be learned is unknown to the learner.

One or more of the alphabetic indicia in these succeeding sentence indicia may represent previously learned high-frequency words for repetition purposes. Thus, in each sentence indicia, there is only one unknown indicia, and that is the indicia representing the high-frequency word to be learned, so that the learner can use the sentence context as a clue to decoding the unknown indicia and thereby can decode the entire sentence indicia.

Thus, the instructional elements are displayed seriatim to the learner to introduce new indicia representing high-frequency words and to reinforce the previously learned words by repeating alphabetic indicia representing such previously learned words. As will become apparent to those skilled in the art, the instructional elements can be arranged in groups, and if desired, bound into books, for different grade levels or different age groups.

The set 5 of auxiliary reinforcement elements are used after the learner has mastered a few of the high-frequency words to be learned. The set 5 of reinforcement elements can be used for one learner or a group of learners, such as in a class room setting. The set 5 is used to play a game, and in so doing, the newly introduced words learned by the use of the instructional elements, are reinforced in the mind of the learner in an interesting and stimulating manner, as hereinafter described in greater detail.

Considering now the set 1 of instructional elements in greater detail, in the sentence indicia 20, there are two rebus indicia 29 and 30. The rebus indicia 29 is configured in the shape of a cat and thus represents the word "cat". Similarly, the rebus indicia 30 is configured in the shape of a wagon and thus represents the word "wagon".

The sentence indicia 20 further includes three alphabetic indicia 31, 35 and 37, the indicia 35 representing a single high-frequency basic sight word ("in") to be learned and the indicia 31 and 37 both representing the article "a". A punctuation indicia 39 represents a period (.). In this manner, the alphabetic words, including the single high-frequency word to be learned, cooperate to form a sentence context (in this case, an incomplete sentence), "A cat in a wagon.", to facilitate the decoding of the high-frequency word "in".

It should be noted that while some authorities define the article "a" as being a basic sight word, for the purpose of the present invention, the article "a" or "A" is not considered to be a high-frequency basic sight word to be learned, because it is also a letter of the alphabet and the learner is presumed to be familiar with at least some of the letters of the alphabet. It should also be understood that while the alphabetic indicia shown and described herein are in the English language, it will become apparent to those skilled in the art that high-frequency words of other languages may also be learned by the educational aid of the present invention. Additionally, the alphabetic indicia may be numerical indicia for learning to recognize numbers.

The sentence indicia 22 and 24 include respective alphabetic indicia 39 and 41 also representing the word "in" for repetition purposes. In this manner, once the student learns the high-frequency word "in" from the instructions of the teacher and the use of the sentence indicia 20, the teacher then uses the sentence indicia 22 and subsequently the sentence indicia 24 to reinforce the learning experience having taken place in connection with the use of the sentence indicia 20.

The sentence indicia 26 and 28 are then employed and include respective indicia 43 and 45 both representing a new word "is", which is also a high-frequency basic sight word to be learned. The sentence indicia 26 and 28 further includes alphabetic indicia 47 and 49 both representing the word "in" for reinforcement purposes.

The instructional element 3 is somewhat similar in construction to the element 2 and includes a series of five sentence indicia 52, 54, 56, 58 and 60. The sentence indicia 52 includes a pair of alphabetic indicia 62 and 64 representing the respective words "is" and "in", to further repeat, and thus reinforce, the words learned from the use of the instructional element 2. The sentence indicia 54 includes an alphabetic indicia 66 representing the high-frequency basic sight word "and" to introduce that word for learning purposes.

The sentence indicia 56, 58 and 60 each includes an alphabetic indicia 68, 72 and 74, each representing the word "and" for repetition purposes.

The instructional element 4 is also somewhat similar in construction to the element 2 and includes a series of five sentence indicia 76, 78, 81, 83 and 85. The sentence indicia 76 includes an alphabetic indicia 87 representing the high-frequency word "and" and an alphabetic indicia 89 representing the word "in" for reinforcing the learning of those two words from the previous two instructional elements. The sentence indicia 78 includes alphabetic indicia 91 and 93 representing the respective words "and" and "in" for the further reinforcement of the learning of those two words. The sentence indicia 81 includes an alphabetic indicia 94 representing the word "The", which is a newly-introduced high-frequency basic sight word to be learned. The sentence indicia 81 further includes alphabetic indicia 95 and 97 representing the respective words "is" and "in" for further reinforcement of those two previously learned words.

The sentence indicia 83 includes an alphabetic indicia 98 representing the word "The" for reinforcing purposes. The sentence indicia 83 further includes a pair of alphabetic indicia 99 and 101 representing the previously-introduced words "is" and "in", respectively, to provide the learner with a review of those words. Similarly, the sentence indicia 85 includes an alphabetic indicia 102 representing the word "The" for further repetition purposes. An alphabetic indicia 103 representing the word "is" and an alphabetic indicia 105 representing the word "in" are also included in the sentence indicia 85 for repetition purposes.

Considering now the instructional element 2 in greater detail, the sentence indicia 22 includes alphabetic indicia 107 and 109 representing the respective words "A" and "a". A rebus indicia 112 and 114 are configured in the shape of a little boy and in the shape of a wagon, respectively, so that the sentence indicia 22 may read as "A boy in a wagon".

The sentence indicia 24 includes an alphabetic indicia 116 representing the word "A" and a pair of rebus indicia 118 and 120 representing the respective word equivalent of a boat and of water, respectively. Thus, the sentence indicia 24 may be read as "A boat in water". The sentence indicia 26 includes an alphabetic indicia 122 representing the word "A" and a pair of rebus indicia 126 and 128 representing the respective word equivalents of a cat and of a wagon. Thus, the sentence indicia 26 may be read as "A cat is in a wagon.".

The sentence indicia 28 similarly includes an alphabetic indicia "A" and rebus indicia 136 and 138 representing the respective word equivalents for a boy and for a house, so that the sentence indicia 28 may be read as "A boy is in a house.".

For review purposes and also for the use of the teacher, disposed below the sentence indicia 16 is an indicator indicia 141 configured in the shape of a straight line, are a series of indicia representing the words and letters introduced in the sentence indicia 16. In this regard, below the line indicia 141, are four alphabetic indicia 143, 145, 147 and 149 representing the respective words "in", "is", "A" and "a". In this regard, the learner can use the indicia 143, 145, 147 and 149 as a review of the words and letters introduced by the use of the instructional element 12. Also, the teacher can see, at a glance, those indicia below the line indicia 141, for the purpose of learning the words to be learned by the use of the sentence indicia 16.

Considering now the instructional element 3 in greater detail, the sentence indicia 52 includes an alphabetic indicia 150 representing the word "A", and rebus indicia 151 and 153 representing the respective word equivalents of fish and water, so that the sentence indicia 52 can be read as "A fish is in water.". In a similar manner, the remaining sentence indicia includes alphabetic and sentence indicia cooperating to represent sentences. The sentence indicia 54 can be read as follows: "A boy and a girl.". The sentence indicia 56 can be read "A flower and a tree.". The sentence indicia 58 can be read "A cat and a wagon.". The sentence indicia 60 can be read "A boy and a wagon.".

Below the sentence indicia of the element 3 there is an indicia 159 configured in the shape of a straight line, and an indicia 162 representing the word "and" is disposed therebelow for the purpose of identifying the new high-frequency word introduced by the instructional element 3 in a similar manner as the indicia at the bottom portion of the instructional element 2.

Considering now the instructional element 4 in greater detail, the sentence indicia 76 includes alphabetic indicia 163 and 165 representing the respective words "A" and "a". A pair of rebus indicia 166 and 168 represent the word equivalent of "ball" and of "wagon", respectively. A rebus indicia 164 represents the word equivalent of "block". Thus, the sentence indicia 76 can be read as follows: "A block and ball in a wagon.".

The remaining sentence indicia also includes alphabetic and rebus indicia, which cooperate to represent a sentence. The sentence indicia 78 can be read as follows: "A boy and a girl in a wagon.". The sentence indicia 81 can be read as "The girl is in a wagon.". The sentence indicia 83 can be read as "The boy is in a wagon.". Finally, the sentence indicia 85 can be read as "The cat is in a car.".

Disposed below the sentence indicia of the instructional element 4 is an indicator indicia 178 configured in the shape of a straight line, below which is disposed an alphabetic indicia 181 representing the word "The", which is the newly-introduced high-frequency word for the instructional element 4.

It should be noted that the alphabetic indicia are each configured in the shape of simple block letters, which are of the type that a child initially learns when the child begins to write. Thus, the young learner is familiar with such lettering, and the learning aid A helps reinforce any newly-acquired writing skills of the learner. The rebus indicia are configured in the shape of easily recognizable, familiar objects and activities (not shown), and are shown in a simple, outlined style, preferably in black ink on white paper, to permit the young learner to color in the rebus indicia with colored pencils, or the like, for reinforcement purposes.

Considering now the reinforcement aid 5, each of the elements 6–9 of the aid 5 bears alphabetic indicia representing the high-frequency basic sight words corresponding to the same words learned from the use of the set 1 of the instructional elements. The elements 6–9 also bear sentence indicia representing sentences corresponding to the same sentences learned from the use of the set 1.

In use, after a desired number of high-frequency words have been learned by the use of the set 1, a game can be played using the reinforcement elements 6–9. Briefly, during the first phase of the game, the alphabetic indicia, representing the high-frequency words previously learned of the elements 6–9, are displayed seriatim to the learner, or a group of learners, who are then asked to identify the high-frequency word represented by the indicia. During the second phase of the game, if the learner successfully identifies the word, then the learner is asked to read the sentence represented by the sentence indicia of that reinforcement element.

The reinforcement element 6 includes a background member 182 having on its front or obverse face an alphabetic indicia 183 representing the word "in", which corresponds to the word "in" represented by the alphabetic indicia 35 of the sentence indicia 20 of the instructional element 2. The background members of the elements 6–9 are preferably composed of paper board material, but other materials may also be employed as will become apparent to those skilled in the art. The front face of the instructional element 6 is displayed to the learner who is then asked to identify the word "in" represented by the indicia 183 after having used the instructional element 2 or other instructional elements. If the learner can identify the word "in" represented by the indicia 183, then the learner is given the instructional element 6 to be held until the second phase of the game. As shown in FIG. 2, a sentence indicia 195 is disposed on the rear face of the element 6 and is similar to the sentence indicia 20 of the element 2, as hereinafter described in greater detail.

The instructional element 7 includes a background member 184, which is similar to the background member 12 of the instructional element 2. On the front face thereof, there is disposed an alphabetic indicia 185 representing the word "is" corresponding to the word "is" represented by the alphabetic indicia 43 of the sentence indicia 26 of the instructional element 2. On the reverse face (not shown) of the background member 184 there is a sentence indicia (not shown), similar to the sentence indicia 26 including an alphabetic indicia (not shown) representing the word "is" for reinforcement purposes. The reverse faces of the elements 6–9 are used during the second phase of the game as hereinafter described in greater detail.

The instructional element 8 includes a background member 186 having an alphabetic indicia 187 on the front face thereof to represent the word "and" corresponding to the word "and" represented by the corresponding alphabetic indicia on the instructional element 3. On the reverse side of the reinforcement element 8, there is disposed a sentence indicia (not shown) including an alphabetic indicia (not shown) representing the word "and", and may be similar to the sentence indicia 54.

The reinforcement element 9 includes a background member 188 having on its front face an alphabetic indicia 189 representing the word "The" corresponding to the similar indicia found on the instructional element 1. On the reverse side of the element 9, there is disposed a sentence indicia (not shown) including indicia representing the word "The", similar to the sentence indicia 81 of the instructional element 4.

Referring now to FIG. 2, on the reverse side of the reinforcement element 6, there is disposed the sentence indicia 195, which includes an alphabetic indicia 193 representing the word "in" corresponding to the word "in" represented by the alphabetic indicia 183 on the front side of the element 6 as shown in FIG. 1. A pair of alphabetic indicia 191 and 197 are configured to represent the respective words "A" and "a". A pair of rebus indicia 199 and 201 represent the respective word equivalents "cat" and "wagon". An indicia 203 is configured to represent a punctuation mark, namely a period (.). Thus, the sentence indicia 191 can be read as "A cat in a wagon.".

During the second phase of the game, the learner who correctly identified the word "in" represented by the indicia 183, is permitted to identify the sentence represented by the sentence indicia 195. If successful, the learner is given credit for the achievement.

The method of use of the learning aid A of this invention will now be described, assuming that the learning aid is being used in a classroom. Initially, all of the rebus indicia are discussed and identified to familiarize the student learners with them. The teacher then directs the attention of the student learner to the "A" alphabetic indicia 14 and the "a" alphabetic indicia 37 of the sentence indicia 20 and explains the difference in their forms as being due to the fact that "A" is a capital letter used at the beginning of a sentence and "a" is a lower case letter used in the interior of a sentence. The teacher then speaks, or says, the words "A", and "a" aloud, and requests the learner to speak the words "A" and "a" aloud.

The teacher then displays, and directs the attention of the learner to the "in" alphabetic indicia 35 of the sentence indicia 20. The teacher then speaks aloud the word "in", represented by the indicia 35, and requests the learner to pronounce the word "in".

The teacher then requests the learner to read aloud the entire sentence 20 represented by the sentence indicia 20. The learner then attempts to say aloud the words "A", "a" and "in" represented by the corresponding indicia, and pronounces the word equivalents depicted by the rebus indicia. For example, in the sentence indicia 20, the first rebus indicia 29 represents the word equivalent for a cat, the second rebus indicia 30 represents the word equivalent for a wagon. The learner reads the sentence indicia 20 as: "A cat in a wagon", and the teacher corrects the learner, if necessary.

The teacher then displays, and directs the attention of the learner to the portion of the background member bearing the sentence indicia 22 and 24 of the element 2 and requests the learner to read aloud the sentence represented thereby. The teacher corrects any mistakes the student makes. The sentence indicia 22 and 24 contain no high frequency words other than those already introduced, and serve, for practice purposes, to help to fix, in the mind of the learner, the configuration of the word "in", for sight recognition.

The teacher then displays, and directs the attention of the learner to, the "is" alphabetic indicia 43. The teacher points out to the learner the differences in appearance and in sound between the word "is" and the word "in", and pronounces the word "is" to help the learner understand it. The teacher then requests the learner to speak aloud the word "is". The teacher then requests the learner to read aloud the sentence indicia 26 and 28, which contain only the previously-introduced alphabetic indicia and the newly-introduced high-frequency indicia "is" to serve as practice in reading the previously-introduced words.

The teacher then requests the learner to read the sentences represented by the sentence indicia 20, 22, 24, 26 and 28, first individually, then as a group. When the teacher is satisfied that the learner can read the sentences represented by the sentence indicia, the teacher then promotes the reading skill of the learner by conventional methods. As an example, the teacher requests the learner to find the alphabetic "is" indicia 145 at the bottom of the element 2 and to circle it, as well as to find it in the sentence indicia of the element 2 and to circle each occurrence of the "is" indicia therein. The learner is then requested to underline each occurrence of the "A" indicia and the "a" indicia in the element 2. The learner is then asked to identify the remaining alphabetic indicia ("in" indicia 47 and 49). The desire of the person to learn can be further stimulated by known techniques, such as by allowing the learner to color the rebus indicia if the sentences of the element 2 are read correctly.

After completion of work with the element 2 of FIG. 1, the first element in the learning aid of this invention, the teacher proceeds to the element 3 in the teaching sequence. The sentence indicia 52 is displayed and the attention of the learner is directed thereto. The sentence indicia 52 contains no new word alphabetic indicia and serves as practice for recognition of the words "A", "a", and "in", which were previously introduced in the element 2 of FIG. 1.

The sentence indicia 54 is next displayed to the learner and the "and" alphabetic indicia 66. The teacher then speaks aloud the word "and" represented by the indicia 66. The teacher then requests the learner to speak aloud the word "and". The teacher then requests the learner to read aloud the entire sentence 54 represented by the sentence indicia. The sentence indicia 54 contains indicia representing the previously-introduced words "A" and "a", in addition to the indicia 66 representing the newly-introduced word "and". Thus, the skills are reinforced in identifying the indicia representing the previously-introduced words, as well as increasing the vocabulary of words recognizable instantly at sight.

In a manner similar to that hereinabove described, the teacher displays to the learner, and requests the learner to read aloud, the sentences represented by the indicia 56, 58 and 60. These sentences contain only the newly-introduced indicia representing the word "and", and indicia representing the previously-introduced words "A", "a" and "in" to serve as practice material in reinforcing the recognition of all these words.

After completion of work with the element 3, the next succeeding element 4 of the educational aid A is displayed to the learner. Sentence indicia 76 and 78 of the element 4 are displayed to the learner, and, since they contain only previously-introduced indicia, the learner is requested to read them aloud for practice.

The sentence indicia 81 is then displayed to the learner and attention is directed to the indicia 81 representing the word "The". The teacher pronounces the word "The", and then requests the learner to say the word "The". The teacher then requests the learner to read aloud the sentence represented by the sentence indicia 81. The teacher then requests the learner to read aloud the sentence indicia 83 and 85, which represent sentences containing indicia representing the new word "The" and previously-introduced words. The teacher corrects the learner if any mistakes are made.

The method described hereinabove is followed for each successive instructional element (not shown) of the educational aid A of this invention.

Considering now the method of using the reinforcement aid A, the auxiliary reinforcement aid 5 is preferably used with a group of learners, in a game, or play, setting, following the use of the instructional elements. The teacher first selects a collection of the reinforcement elements which bear indicia on the front and rear faces thereof representing words and sentences previously encountered and mastered during instruction with the instructional elements 1 of the educational aid A.

The teacher then displays the front face of the element 6 to the learners and asks the first game player to read the word represented by the indicia 183. If the player can do so, the element 183 is given to that person to hold. If the player is unable to read the indicia 183, the teacher can assist the player, for example, by giving phonetic clues to the sound of the word, or can spell it out or have the player spell it. If the player is still unable to read the word, the teacher proceeds to the next player and repeats the question, and clues, if necessary. The teacher proceeds through the group of learners until one of them is able to read the word, and then that learner is given the element 6 to hold. If no learner is able to read the indicia 183, the teacher retains the element 6 and reads the word "in" to the group of learners. The above procedure is repeated with each reinforcement element in the collection until all have been displayed to the players. At that time, the player holding the largest number of elements is declared the winner of the game.

The teacher next asks the learners to look at the rear faces of the reinforcement elements which they hold. The teacher asks the first player to read the sentence indicia on his or her reinforcement elements, and to identify the rebus indicia thereon. When the sentence indicia is read correctly, the teacher takes back that reinforcement element. If the player is unable to read the sentence indicia, the next player is asked to read it. The requesting of a player to read the sentence indicia continues until either a player reads the sentence correctly, or none of the players reads it correctly. If no student is able to read the sentence indicia, the teacher reads it aloud, then takes back the reinforcement element. The foregoing procedure is carried out for all the reinforcement elements held by the players. The game ends when the teacher has possession of all reinforcement elements in the collection.

Upon review of the foregoing description, it should now be apparent that the sentences represented by the sentence indicia can be arranged sequentially in simple story form to add further interest to the use of the educational aid A. Also, it will be apparent to those skilled in the art that the learning reinforcement aid of the invention is useful in the teaching of spelling of the words introduced with the use of the instructional elements of the educational aid A of this invention.

While the preferred embodiment of the present invention has been illustrated and described, it will be apparent that other changes, modifications and applications may be made within the spirit and scope of the invention. It is intended that all such changes, modifications and applications be included within the scope of the appended claims.

We claim:

1. A method of using an educational aid for facilitating the instruction of learners in the ability to read comprising, in combination:

an ordered set of instructional elements for use seriatim according to a teaching plan, each element including:

background means having indicia thereon;

said indicia including an ordered series of sentence indicia;

a first one of said sentence indicia including a first alphabetic indicia representing a first single high-frequency word to be learned and at least a first rebus indicia representing a word equivalent cooperating with the high frequency word to help form a first sentence to facilitate the decoding said first alphabetic indicia in accordance with a teaching plan;

a second one of said sentence indicia including a second alphabetic indicia representing said single high-frequency word to be learned for repetition purposes and at least a second rebus indicia representing a word equivalent cooperating with the high frequency word to help form a second sentence to facilitate the decoding said second alphabetic indicia in accordance with the teaching plan;

a third one of said sentence indicia including a third alphabetic indicia representing a second single high-frequency word to be learned and at least a third rebus indicia representing a word equivalent cooperating with the second high-frequency word to help form a third sentence to facilitate the decoding said third alphabetic indicia in accordance with the teaching plan, wherein said third one of said sentence indicia includes a fourth alphabetic indicia representing said single high-frequency word to be learned for reinforcement purposes;

a fourth one of said sentence indicia including a fifth alphabetic indicia representing said second single high-frequency word to be learned for repetition purposes and at least a fourth rebus indicia representing a word equivalent cooperating with said second high-frequency word to help form a fourth sentence to facilitate the decoding said fifth alphabetic indicia in accordance with the teaching plan;

displaying the first one of said sentence indicia to the learner according to the teaching plan;

directing the attention of the learner to said first alphabetic indicia representing said single high-frequency word to be learned for explaining said word to the learner;

displaying the second one of said sentence indicia to the learner;

requesting the learner to read said second sentence to facilitate the decoding of said second indicia;

displaying the third one of said sentence indicia to the learner;

requesting the learner to read said third sentence to facilitate the decoding said third alphabetic indicia; and repeating the displaying and requesting steps for the fourth and any additional ones of said sentence indicia;

whereby each subsequent sentence indicia includes at the most only one new alphabetic indicia representing a single new high-frequency word to be learned and possibly some alphabetic indicia representing one or more previously learned high-frequency words.

2. A method according to claim 1 wherein said background means includes a flat sheet composed of an opaque material.

3. A method according to claim 1, wherein the opaque material is paper material.

4. A method according to claim 1, further including an auxiliary learning reinforcement aid including a set of game elements for use seriatim according to a teaching plan, said elements including individual background means, each one of said means having a front face bearing a different alphabetic indicia representing one of said high-frequency words to be learned represented by the corresponding alphabetic indicia of said instructional elements and having a rear face bearing a different sentence indicia representing a sentence including the high-frequency word represented by the indicia on its front face.

5. A method according to claim 1, further including displaying the fourth one of said sentence indicia to the learner, and requesting the learner to read said fourth sentence to facilitate the decoding said fourth alphabetic indicia.

6. A method according to claim 1, further including providing an auxiliary learning reinforcement aid including a set of game elements for use seriatim according to a teaching plan, said elements including individual background means, each one of said means having a front face bearing a different alphabetic indicia representing one of said high-frequency words to be learned represented by the corresponding alphabetic indicia of said instructional elements and having a rear face bearing a different sentence indicia representing a sentence including the high-frequency word represented by the indicia on its front face.

7. A method according to claim 6, further including displaying the front face of said game elements seriatim;

requesting repeatedly the learner to read the alphabetic indicia thereon;

distributing the game elements to the learner when the indicia on the front faces thereof are correctly identified; and requesting repeatedly the learner to read the indicia on the rear faces of the distributed game elements.

8. The educational aid of claim 4, wherein said game elements are each composed of paperboard material.

* * * * *